Oct. 14, 1924.
J. H. TAYLOR
1,511,849
METHOD OF WELDING TUBING
Filed Jan. 21, 1922
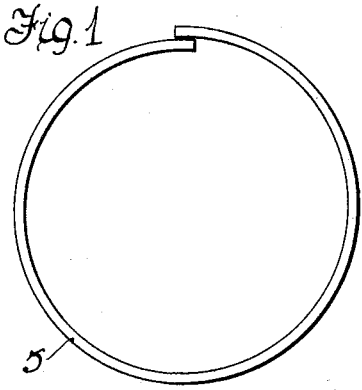
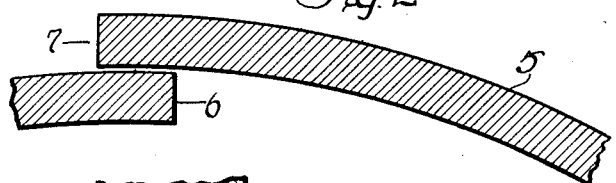
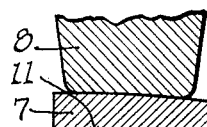
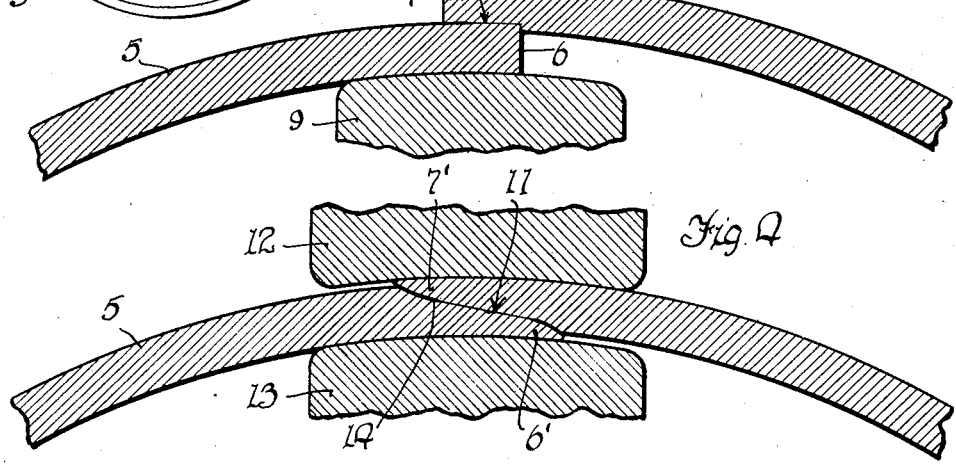
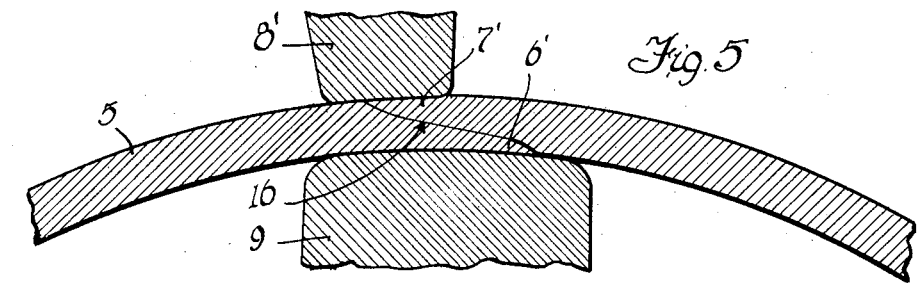
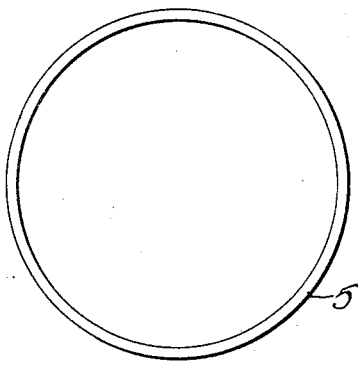
Inventor
James Hall Taylor
By Brown Boettcher Dienner
Att'ys Patented Oct. 14, 1924.

1,511,849

UNITED STATES PATENT OFFICE.

JAMES HALL TAYLOR, OF CHICAGO, ILLINOIS.

METHOD OF WELDING TUBING.

Application filed January 21, 1922. Serial No. 530,810.

*To all whom it may concern:*

Be it known that I, JAMES HALL TAYLOR, a citizen of the United States, residing at Chicago, in the county of Cook and State of Illinois, have invented a certain new and useful Improvement in Methods of Welding Tubing, of which the following is a full, clear, concise, and exact description, reference being had to the accompanying drawings, forming a part of this specification.

The present invention relates to a method of welding tubing.

The invention has the following objects. First, to provide an improved method or process which will be capable of electrically welding stock of greater sectional thickness than has heretofore been commercially practicable; and, second, to provide a process of electrically welding tubing which will produce a scarfed weld of a thickness substantially equal to the thickness of the tubing.

One of the first methods practiced in the lap welding of tubing was the so-called spot welding process, wherein the weld was spotted or confined to spaced points along the length of the tubing. This method was objectionable because the intermediate areas where there was no fusion of the metal were incapable of holding high pressures against leakage, or even permeable liquids. There has since been advocated a process of lap welding tubing and the like where the weld is performed by advancing a welding roller along the seam, this roller conveying the welding current to the seam and being applied with considerable mechanical pressure. The advantage of this process resides in the fact that the fusion of the metal is continuous from one end of the seam or joint to the other, so that the mechanical strength of the joint is increased and any tendency for leakage through the joint is substantially if not entirely eliminated. This electric seam welding process has heretofore been limited to working upon relatively thin materials, however. Such method of welding heavy, thick materials is objectionable because of the great thickness of the resulting lap projection, which is undesirable for most classes of work. The double thickness of the seam also renders the seam or joint very stiff and susceptible to breakage.

I propose utilizing the foregoing electric seam welding process as a step or part of my present process, but aim to overcome the disadvantages thereof by shaping or working the metal for the purpose of extending the area of welded engagement and for eliminating the double thickness and projection of the lap joint. This shaping of the metal is performed by rolling the projecting edges of the lap welded seam into the body of the stock, which reduces the thickness of the joint to substantially the thickness of the original stock. The metal displaced in this rolling process is upset laterally, whereby these overlapping portions of the metal form a scarf joint between the edges of the tubing. The abutting surfaces of this scarfed joint are held rigidly together by the original lap weld which has been rolled into an intermediate position in the scarfed joint. The adjoining surfaces of the scarf joint to either side of the original lap weld are now welded together, preferably by the foregoing electric seam welding process. The result is a closely fitting scarf weld which is welded over an extensive area of the opposing scarfed faces of the joint. Such weld has ample strength and is free from any possibility of leakage.

I shall now set forth in detail in the accompanying drawings the various steps of one preferred manner of performing the process.

In the drawings:

Figure 1 illustrates the tubing with its ends lapped preliminary to performing the present welding operations;

Fig. 2 is a fragmentary sectional view of the lapped edges on an enlarged scale.

Fig. 3 is a similar view showing the first step of performing the electric seam weld.

Fig. 4 illustrates the second step of rolling down the projecting edges of the electric seam weld.

Fig. 5 illustrates the step of welding opposing faces of the scarfed joint resulting from the above rolling operation; and Fig. 6 illustrates the completely welded tube.

It will be understood that the tubing 5 may be of circular, polygonal or any other outline and may be used for the construction of pipes, drums, or the like. The invention has been described so far with reference to the welding of tubing, because of the greater utility of the process in this field, but there is nothing to preclude the use of the present process for similarly joining the edges of flat or non-tubular stock. Referring again to the tubing 5, the two edges 6 and 7 thereof are first placed in lapped relation, as shown in Fig. 1, and are rigidly held in this position in any suitable manner for the performance of the lap welding operation. This weld is performed by advancing a welding roller 8 either intermittently or continuously along the outer part of the lapped joint. The general practice is an intermittent operation, from which the process derives a name by which it is often called in the trade, "the roll-step method." The inner side of the lapped joint is reinforced by a longitudinal rail or bar 9. Considerable mechanical pressure is exerted on the lap joint through the roller 8, the member 9 carrying this pressure. The roller 8 and supporting member 9 constitute the two electrodes for passing the welding current through the lap joint. The roller 8 may be disposed so that its pressure and the flow of current therefrom will weld across the entire width of the lap joint, or across only a part thereof. It is well known in the trade that the resulting weld is decidedly superior to the spot weld type of lap joint from the standpoint of strength and tightness against leakage, this presumably following from the pressure exerted through the roller 8 and the rolling advancement thereof, which results in a continuous fusion of the metal along the entire joint and probably in the excretion or squeezing out of all impurities between the opposing faces of the joint. These impurities, which arise principally from the oxidization of the metal and its impurities, usually render difficult the welding of any extensive area, but the roller 8, by its advancing pressure presumably tends to excrete or squeeze out these impurities from the abutting faces of the joint so that difficulty from this source is largely eliminated. The resulting weld is indicated in Fig. 3 by the thin line 11.

After the completion of the lap weld 11, the tubing 5 is drawn between two rolls 12 and 13, as shown in Fig. 4. These rolls upset the projecting edges of the lap joint, and by one or more rolling operations bring the opposing ends 6 and 7 into substantially the same circular plane. The metal which is displaced from each of the projecting corners flows laterally outward over the surface of the opposing edge of the tubing. The result is upset, attenuated portions of metal 6' and 7' which are compressed into the body of the tubing and which produce a long, diagonal scarfed joint 14. This rolling operation may be performed with the tubing either hot or cold.

In the scarfed joint 14 produced by the preceding step, it will be noted that the lap weld 11 is disposed substantially centrally of the joint with the upset portions 6' and 7' extending to opposite sides of the lap weld 11 and engaging with the opposing edge of the tubing. The next step is to weld one or both of these upset portions 6' and 7' to the opposing edge or edges of the tubing. This welding operation may be performed by welding one or both of the two upset portions 6' and 7' either separately or simultaneously under the welding roller 8' as indicated in Fig. 5. When welding the inner side 6' of the scarfed joint the welding roller may be engaged with and rolled along the inner side of the joint within the tubing in an obvious manner. The welding of the end portions of the scarfed joint is preferably performed by the electric seam welding process heretofore described, so that the weld of this scarfed joint will be substantially continuous. In the rolling operation illustrated in Fig. 4, the two edges of the scarf joint are not rolled into exact registration, but are preferably left slightly out of register so that the pressure applied in the subsequent welding operation will bring the two edges substantially into the same plane without reducing the sectional thickness of the finished joint.

Particular note should be made of the fact that the abutting faces of the scarf joint 14 are maintained in exact registry at all times during this subsequent welding operation, or operations, so that the latter are facilitated. If it were attempted to produce the joint shown in Fig. 5 by scarfing the opposing edges of the tubing and then welding them together a very considerable difficulty would be encountered in maintaining these opposing faces in registry at all times and under the proper pressure. Moreover, this is aside from the large expense of scarfing the edges of the stock, and the difficulty of welding the relatively extensive area extending across the entire width of the scarf joint, wherein impurities caught between the welding surfaces would form an imperfect weld. The welding of the ends of the scarf joint under the roller or rollers 8' excretes the impurities tending to accumulate between the opposing faces of these portions of the joint. The finished weld is indicated by the thin line 16.

I claim:—

1. The method of welding tubing or the like which comprises forming a square edge lap joint between the edges of the tubing, electric seam welding this lap joint, compressing this lap joint in a subsequent step to form a scarf joint between the edges, and then welding opposing surfaces in said scarf joint.

2. The method of welding tubing which comprises forming a substantially square edge lap joint between the edges of the tubing and electric seam welding this joint by the roll-step process then rolling said lap joint in a subsequent operation to compress the edges of the tubing into substantially the same plane, and then electrically welding the portions of metal scarfed by said rolling operation to the body of the tubing.

3. The method of welding tubing or the like which comprises overlapping the edges of the tubing in a substantially square edge lap joint, electrically welding the overlapping edges together, rolling the resulting lap joint in a subsequent operation to scarf the edges into substantially the same plane, and then electric seam welding the scarfed edges to the wall of the tubing.

4. The method of welding tubing or the like which comprises forming a substantially square edge lap joint on the tubing electrically welding this lap joint, converting this lap joint into a scarf joint, in a subsequent separate operation and then electrically welding said scarf joint substantially in its entirety.

5. The method of producing a scarf weld which comprises holding the opposing faces of the scarf joint in registry by a previously completed weld between portions of such faces, and completing the joint by welding other portions of said opposing faces electrically.

6. The method of welding tubing or the like which comprises bringing the opposing edges of the tubing together in a substantially square edge lap joint, welding the oppositing faces of said lap joint by a continuous electrical weld, rolling said lap joint to upset the corners thereof and bring the edges of said tubing into substantially the same plane, and then welding the upset portions to the body of the tubing by one or more continuous electrical welds.

7. The method of producing a welded joint between two sections having square edges which comprises electric seam welding a limited area of said square edges together so as to first join said sections over an intermediate portion of their joint, and then electric seam welding a portion of said joint laterally of said first weld.

8. The method of welding tubing which comprises joining the edges of said tubing in a lap joint, electrically welding said lap joint by producing relative motion between said joint and a welding roller held to said joint under pressure, passing the tubing between rolls for scarfing the projecting corners of said lap joint and compressing the opposing edges of the tubing into substantially the same circular plane, said rolling operation being performed with said edges at less than welding temperature and producing a scarf joint between said edges, and then electrically welding the opposing surfaces of said scarf joint to either side of said lap weld.

In witness whereof, I hereunto subscribe my name this 9th day of January, 1922.

JAMES HALL TAYLOR.